No. 763,874. PATENTED JUNE 28, 1904.
J. D. FRANKLIN.
NUT LOCK.
APPLICATION FILED APR. 20, 1904.
NO MODEL.

Witnesses
Phil E. Barnes.
Bessie Fague.

Inventor
Jeff. D. Franklin.

By Victor J. Evans
Attorney

No. 763,874. Patented June 28, 1904.

UNITED STATES PATENT OFFICE.

JEFFERSON D. FRANKLIN, OF MOUNT DORA, FLORIDA.

NUT-LOCK.

SPECIFICATION forming part of Letters Patent No. 763,874, dated June 28, 1904.

Application filed April 20, 1904. Serial No. 204,103. (No model.)

*To all whom it may concern:*

Be it known that I, JEFFERSON D. FRANKLIN, a citizen of the United States, residing at Mount Dora, in the county of Lake and State of Florida, have invented new and useful Improvements in Nut-Locks, of which the following is a specification.

This invention relates to nut-locks, the object being to provide a simple and effective nut-lock which is embodied in and forms a part of the nut and which locks the nut to the bolt without requiring any change in the special formation of the bolt. The locking device is of such nature that it may be fitted to any nut by simply drilling a regular hole of uniformal diameter through one side of the nut, said hole extending from the bore outward to the outside surface of the nut.

With the above general object in view the invention consists in the novel construction, combination, and arrangement of parts, as hereinafter fully described, illustrated, and claimed.

Figure 1:
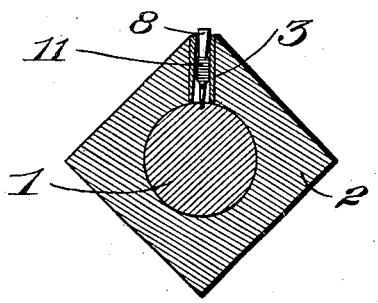
Figure 2:
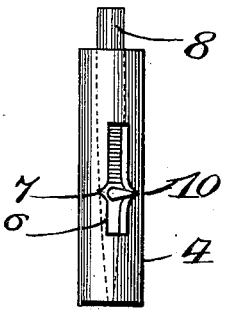
Figure 3:
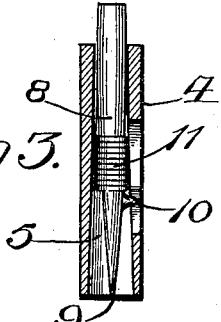

In the accompanying drawings, Figure 1 is a sectional plan view of a nut and bolt, showing the nut-lock in operative position in the nut and engaging the bolt. Fig. 2 is an enlarged view in elevation of the complete nut-lock *per se*. Fig. 3 is a sectional elevation of the same, showing the locking-pin and spring in elevation.

Like reference-numerals designate corresponding parts in all the figures.

Referring to the drawings, 1 designates a bolt, and 2 a nut, said parts being of the ordinary construction and having the usual threaded engagement with each other.

In carrying out the present invention a hole or opening 3 is drilled through one side of the nut, as shown in Fig. 1. This hole is of uniformal diameter throughout and extends from the bore of the nut outward to the outside thereof. The hole 3 may extend either to one corner or angle of the nut or else it may extend to one of the flat sides of the nut, the arrangement at the corner being preferable, however, for the reason that it gives a greater thickness of metal in which to insert the nut-lock.

The nut-lock comprises, essentially, a bushing 4, which is driven into the hole or opening 3 and fastened in any convenient manner, preferably by making the bushing of such diameter externally as to provide a tight frictional engagement between it and the nut. The bushing 4 is provided with a taper bore 5, which expands inwardly, as shown in Fig. 3, said bushing being provided with a slot 6, extending lengthwise thereof and provided at a suitable point with one or more offsets or extensions, which form notches 7, the purpose of which will hereinafter appear.

Mounted in the bushing 4 is a taper pin 8, the length of which is greater than the bushing, so that it may pass entirely through the bushing and leave the outer end thereof projecting, so that it may be struck with a hammer or similar instrument. The inner end of the pin is sharpened or edged, as shown at 9, and said pin is preferably case-hardened, so that it will penetrate the threads of the bolt, and thereby prevent the turning of the nut upon the bolt or the turning of the bolt in the nut.

Extending laterally from the taper pin 8 is a combined shoulder and spring-seat 10, which is adapted to be moved lengthwise of the slot 6 and swung laterally by turning the pin 8, so as to engage any one of the notches 7 for the purpose of holding the engaging-point 9 of the pin out of engagement with the bolt while loosening the nut. Encircling the tapered portion of the pin outside of the shoulder 10 is a coiled spring 11, one end of which bears against the shoulder 10 and the other end of which is caught within and confined by the tapering wall of the bore 5 of the bushing, the spring thus being held between the bushing and the projection 10 and operating by expansion to hold the pin in engagement with the bolt.

In operation after the nut has been screwed down tight the locking taper pin 8 is driven inward by a hammer or sledge, causing it to indent the threads on the bolt, and thus prevent relative axial movement between the bolt and the nut. To loosen the nut, the pin 8 is drawn outward against the tension of the spring 11 and engaged in one of the notches 7, which holds the inner end of the pin out of engagement with the bolt while turning the nut on or off.

Having thus described the invention, what is claimed as new is—

1. The combination with a nut, of a nut-lock consisting of a taper pin mounted in a drilled hole extending from the outside of the nut into the bore thereof, and a coiled spring encircling the pin and binding upon the tapered portion of the bushing and exerting an inward pressure on the pin, substantially as specified.

2. The combination with a nut provided with an opening extending from the bore to the outer surface, of a bushing fast therein and having an inwardly-expanding taper bore, an inwardly-contracting taper pin passing through the bushing and provided with a shoulder, and a spiral spring encircling the pin and engaging the shoulder and inner wall of the bushing.

3. The combination with a nut having an opening extending from its bore to its outer surface, of a bushing fast therein and having an inwardly-expanding taper bore and also provided with a longitudinal slot with an offset notch, a pin passing through the bushing and provided with a shoulder which works in the slot and is adapted to engage the notch, and a spring coiled around the tapered portion of the pin and engaging the shoulder and bushing, the inner end of the bushing being pointed or edged.

In testimony whereof I affix my signature in presence of two witnesses.

JEFF. D. FRANKLIN.

Witnesses:
F. A. HALL,
H. W. BISHOP.